(12) United States Patent
Chen et al.

(10) Patent No.: US 9,852,404 B2
(45) Date of Patent: Dec. 26, 2017

(54) METHODS AND SYSTEMS FOR GROUP TARGETING FOR ADVERTISABLE CALENDAR ENTRIES

(75) Inventors: Daniel Chen, Savoy, IL (US); Matthew Ahrens, Champaign, IL (US)

(73) Assignee: Excalibur IP, LLC, New York, NY (US)

( * ) Notice: Subject to any disclaimer, the term of this patent is extended or adjusted under 35 U.S.C. 154(b) by 1500 days.

(21) Appl. No.: 13/175,743

(22) Filed: Jul. 1, 2011

(65) Prior Publication Data

US 2013/0006732 A1 Jan. 3, 2013

(51) Int. Cl.
*G06Q 30/02* (2012.01)
*G06Q 10/10* (2012.01)

(52) U.S. Cl.
CPC ............ *G06Q 10/109* (2013.01); *G06Q 30/02* (2013.01)

(58) Field of Classification Search
USPC ........................................................ 705/14.5
See application file for complete search history.

(56) References Cited

U.S. PATENT DOCUMENTS

| | | | | |
|---|---|---|---|---|
| 6,820,096 | B1* | 11/2004 | Kanevsky | G06Q 10/109 |
| 7,979,319 | B2* | 7/2011 | Toulotte | G06Q 10/109 705/14.5 |
| 8,041,610 | B1* | 10/2011 | Cirelli et al. | 705/26.1 |
| 8,320,889 | B2* | 11/2012 | Lee | 455/414.1 |
| 2002/0143664 | A1* | 10/2002 | Webb | 705/27 |
| 2005/0215310 | A1* | 9/2005 | Boyd | G07F 17/3227 463/20 |
| 2011/0202398 | A1* | 8/2011 | Photowat | 705/14.5 |
| 2011/0225015 | A1* | 9/2011 | Spivack et al. | 705/7.24 |
| 2011/0258125 | A1* | 10/2011 | Iyer | 705/301 |
| 2012/0022927 | A1* | 1/2012 | Yankovich et al. | 705/14.5 |

* cited by examiner

*Primary Examiner* — David Stoltenberg
*Assistant Examiner* — Allan Woodworth, II
(74) *Attorney, Agent, or Firm* — Mauriel Kapouytian Woods LLP; Lana Akopyan; James J. Woods

(57) ABSTRACT

Techniques are provided which engage users and increase social interaction in group buying. Methods and systems may target users with a first advertisement comprising one or more proposed deals based at least in part on the users' electronic calendar entry information. The advertisements may be served and displayed in the users' electronic calendars. Users' responses to the proposed deal may be tracked. Users may be targeted and served with additional advertisements based at least in part the users' responses to the proposed deal included in the first advertisement and the calendar entry information. Users may forward the advertisements to other individuals to encourage them to participate in the proposed deals in order to receive additional discounts.

19 Claims, 5 Drawing Sheets

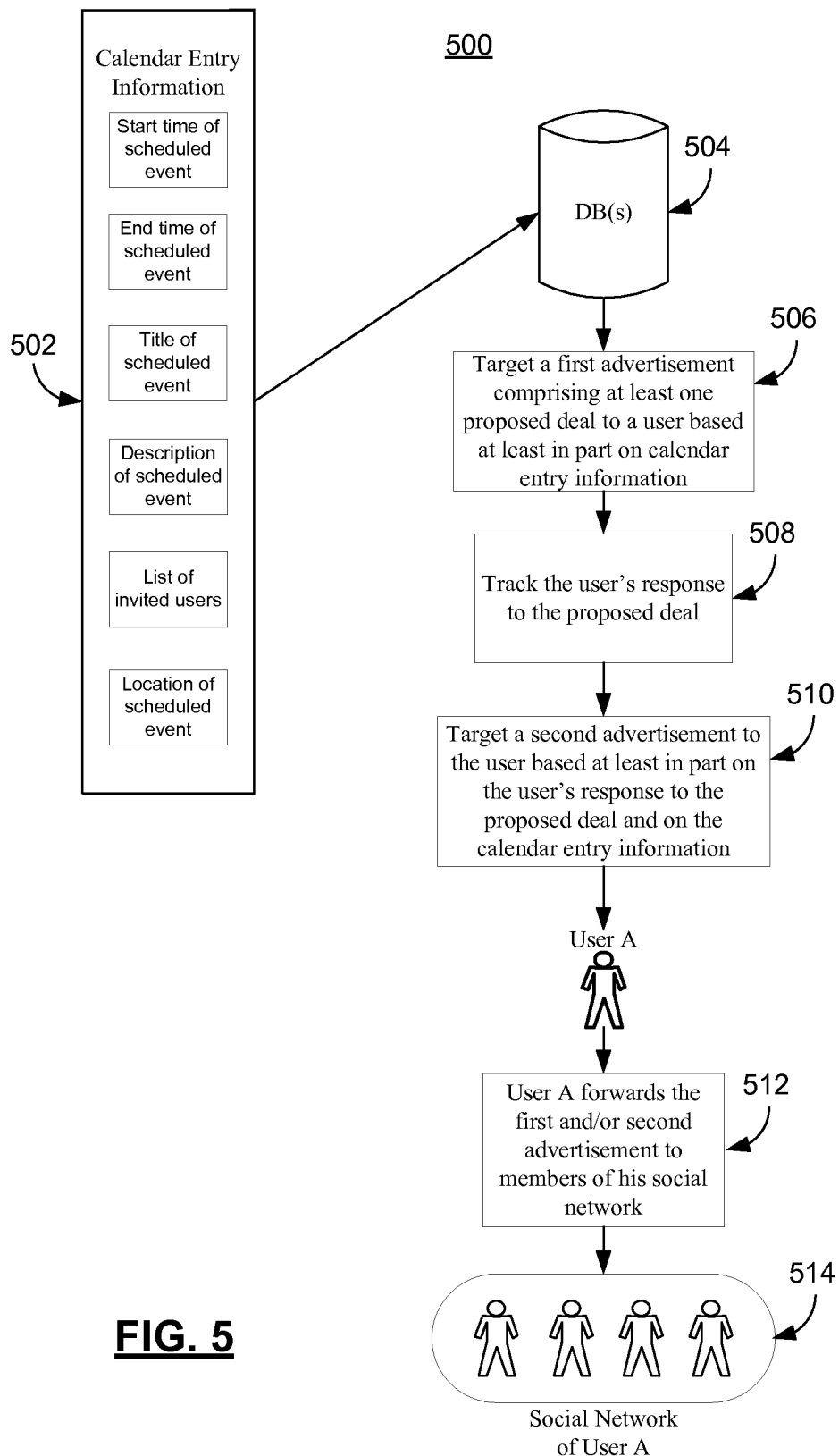

METHODS AND SYSTEMS FOR GROUP TARGETING FOR ADVERTISABLE CALENDAR ENTRIES

BACKGROUND

Recently, group buying has been increasing in popularity. Group buying is a valuable tool that increases advertising engagement because it guarantees commitment to the advertiser or to the business. However, it may be challenging to find relevant groups of users who may be targeted together with the prospect of them all committing to a deal.

There is a need for techniques in online advertising relating to, among other things, encouraging group buying behavior through social interaction among users who participate in group buying.

SUMMARY

Some embodiments of the invention provide systems and methods in which a user may be targeted with one or more advertisements based at least in part on calendar entry information obtained from the user's electronic calendar. The calendar entry information may comprise start time of a scheduled event, end time of a scheduled event, title of a scheduled event, description of a scheduled event, list of users invited to a scheduled event, location of a scheduled event, etc.

In some embodiments, the advertisement may comprise one or more proposed deals. The proposed deal may include, for example, an advertised discount on certain products or services. The advertisement may be served to the user via the electronic calendar. In one example, the advertisement may be displayed within a scheduled calendar entry.

Once the advertisement is served to the user, the user's response to the proposed deal included in the advertisement may be tracked. The user's response may be tracked by determining if the user has accepted or rejected the proposed deal. In some embodiments, the user may accept or reject a proposed deal by, for example, clicking "accept" or "reject".

A second advertisement may be targeted to the user based at least in part on the user's response to the proposed deal included in the first advertisement and at least in part on the calendar entry information. The second advertisement may also be served to the user via the electronic calendar and may be displayed in the electronic calendar. In one example, the advertisement may be displayed within a scheduled calendar entry. In some embodiments, the second advertisement may be related to the first advertisement. In alternate embodiments, the second advertisement may be independent of the first advertisement.

The user may forward the first and/or second advertisements to members of his social network. The user may be provided with an interface within the electronic calendar to enable forwarding of advertisements. The user may be enticed into forwarding the advertisements to other individuals by the prospect of additional discounts. For example, if the second advertisement is from a restaurant, it may include a promotional deal for a 20% discount if the user brings 3-5 friends to the restaurant, and a 30% discount if the user brings more than 5 friends. This may encourage the user to convince his friends to participate in the advertised promotional deal. In some embodiments, the forwarded advertisement may include one or more links associated with the user that forwarded the advertisement. This may provide an indication to recipients of the forwarded advertisement that a colleague has already agreed to participate in the advertised deal.

BRIEF DESCRIPTION OF THE DRAWINGS

FIG. 5 is a block diagram illustrating one embodiment of the invention.

DETAILED DESCRIPTION

Figure 1:
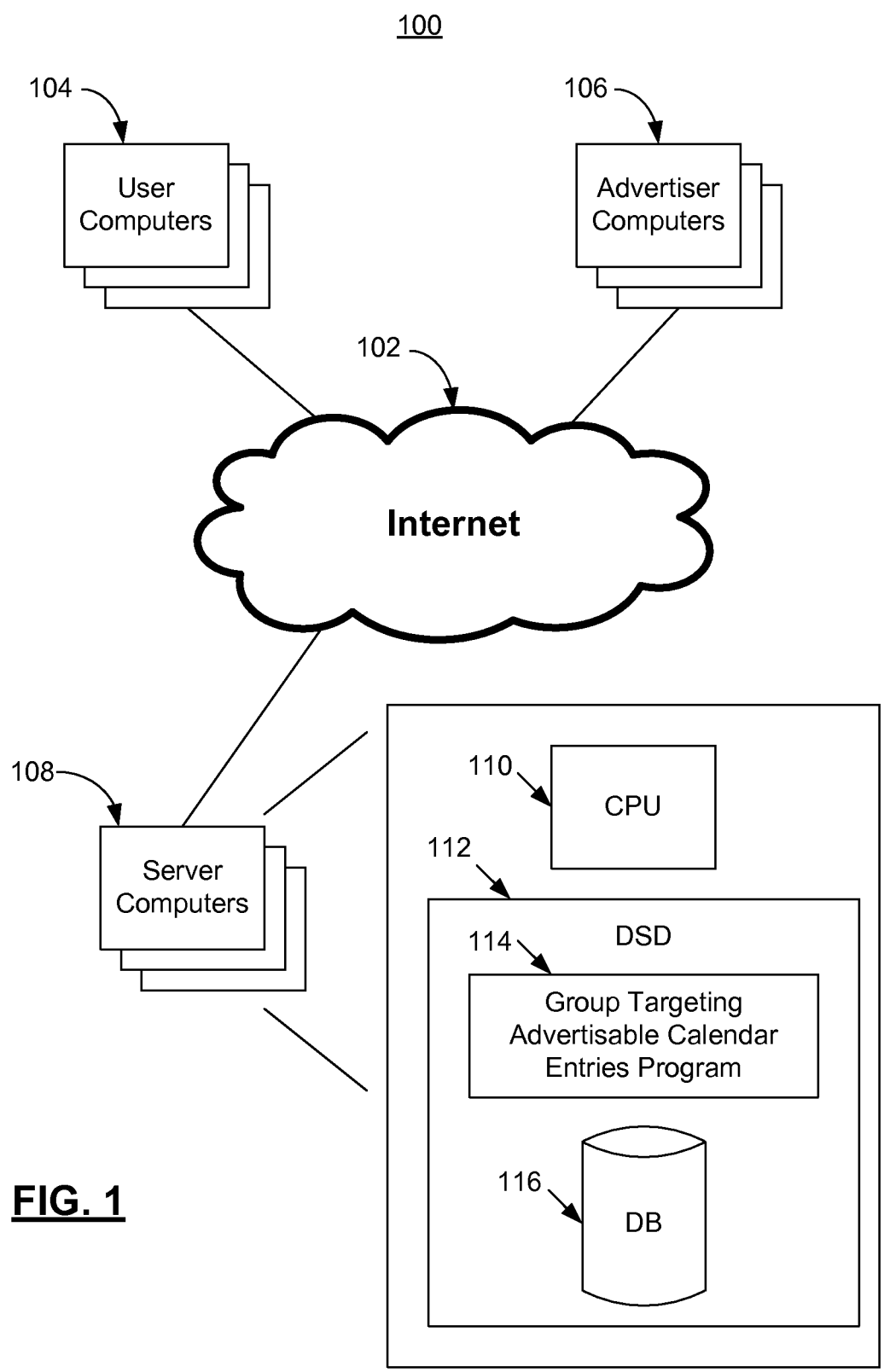
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers 104 may be or include desktop or laptop PCs, as well as, wireless, mobile, or handheld devices such as cell phones, PDAs, tablets, etc.

Each of the one or more computers 104, 106 and 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, social networking related advertisements, coupon or group related advertisements, etc.

As depicted, each of the server computers 108 includes one or more CPUs 110 and a data storage device 112. The data storage device 112 includes a database 116 and a Group Targeting Advertisable Calendar Entries Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
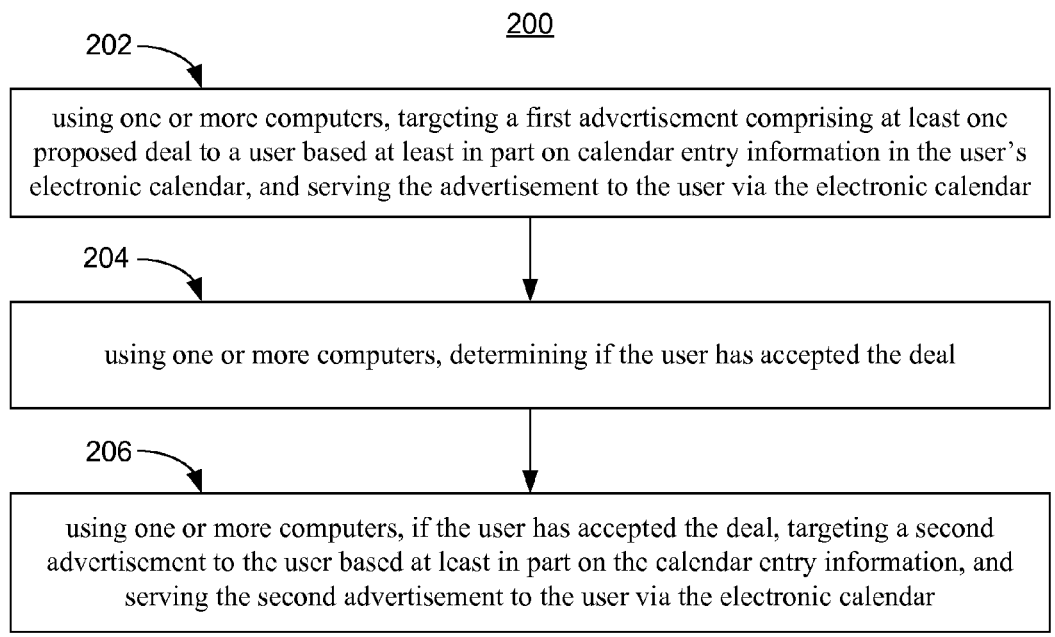
FIG. 2 is a flow diagram illustrating a method according to one embodiment of the invention.

FIG. 2 is a flow diagram illustrating a method 200 according to one embodiment of the invention. At step 202, using one or more computers, a first advertisement comprising at least one proposed deal is targeted to a user. The advertisement is targeted to the user based at least in part on calendar entry information in the user's electronic calendar.

The advertisement is served to the user via the electronic calendar. The calendar entry information may include, for example, start time of a scheduled event, end time of a scheduled event, title of a scheduled event, description of a scheduled event, list of users invited to a scheduled event, location of a scheduled event, etc. For example, if the user has a calendar entry entitled "Lunch" between 12-1 pm, the user may be targeted with a restaurant advertisement comprising one or more lunch specials. The advertisement may be targeted to the user by one or more advertiser computers 106 (FIG. 1), by one or more server computers 108 (FIG. 1), or in combination by one or more server computers 108 and one or more advertiser computers 106.

At step 204, using one or more computers, it is determined if the user has accepted the deal. In some embodiments, the advertisement may comprise one or more links that the user may click on to accept or reject the deal. In the above example, the user may accept the deal by clicking "accept" in response to the proposed lunch specials.

At step 206, using one or more computers, if the user has accepted the deal, a second advertisement is targeted to the user based at least in part on the calendar entry information. The second advertisement is then served to the user via the electronic calendar. Using the above example, if the user accepts the lunch specials promotion, the user may be targeted with a second advertisement from the same restaurant based on the calendar entry entitled "Lunch" from 12-1 pm. The second advertisement may comprise promotions which may include additional discounts. For example, the promotion may be that if the user goes to the restaurant between 12-1 pm, he'll receive a 10% discount, if the goes to the restaurant between 1-2 pm, he'll receive a 20% discount and if he goes between 2-3 pm, he'll receive a 30% discount. Alternatively, or in addition, the second advertisement may include a promotion that encourages the user to invite other individuals. For instance, the promotion may advertise a 20% discount if the user brings along 3-5 individuals to the restaurant, or a 30% discount if the user brings along more than 5 individuals.

Figure 3:
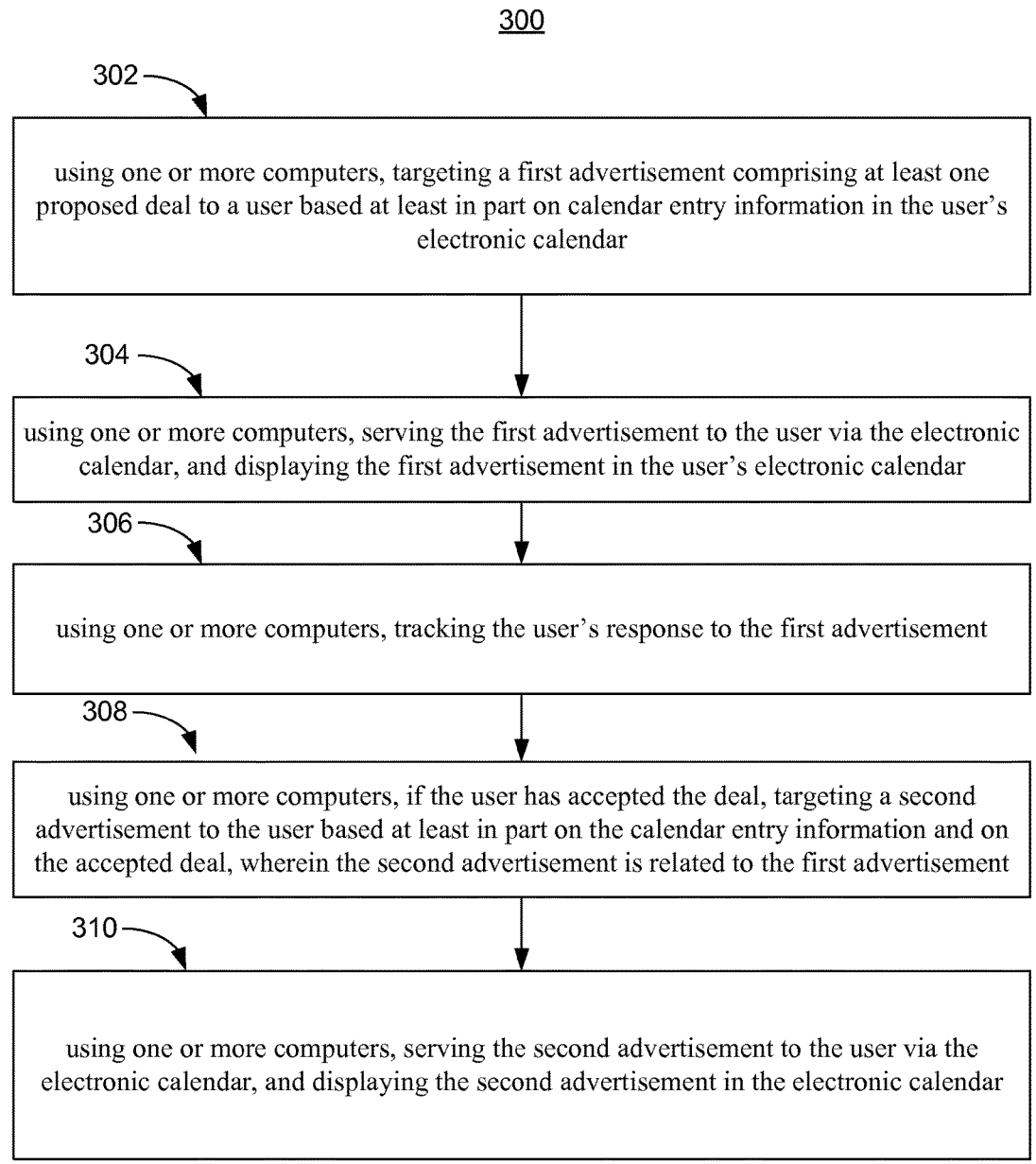
FIG. 3 is a flow diagram illustrating a method according to one embodiment of the invention.

FIG. 3 is a flow diagram illustrating a method 300 according to one embodiment of the invention. At step 302, using one or more computers, a first advertisement comprising at least one proposed deal is targeted to a user based at least in part on calendar entry information in the user's electronic calendar. The calendar entry information may include, for example, start time of a scheduled event, end time of a scheduled event, title of a scheduled event, description of a scheduled event, list of users invited to a scheduled event, location of a scheduled event, etc.

At step 304, using one or more computers, the first advertisement is served to the user via the electronic calendar. The first advertisement may be displayed in the user's electronic calendar. The advertisement may include textual, graphical, audio, video and/or link data. In some embodiments, the advertisement may be received from one or more advertiser computers 106 (FIG. 1) and/or one or more server computers 108 (FIG. 1).

At step 306, using one or more computers, the user's response to the first advertisement is tracked. The user's response may be tracked by, for example, one or more advertiser computers 106 (FIG. 1) and/or one or more server computers 108 (FIG. 1) by determining if the user has accepted or rejected the proposed deal.

At step 308, using one or more computers, if the user has accepted the deal, a second advertisement is targeted to the user based at least in part on the calendar entry information and on the accepted deal, wherein the second advertisement is related to the first advertisement. At step 310, using one or more computers, the second advertisement is served to the user via the electronic calendar. The second advertisement may be displayed in the electronic calendar.

Figure 4:
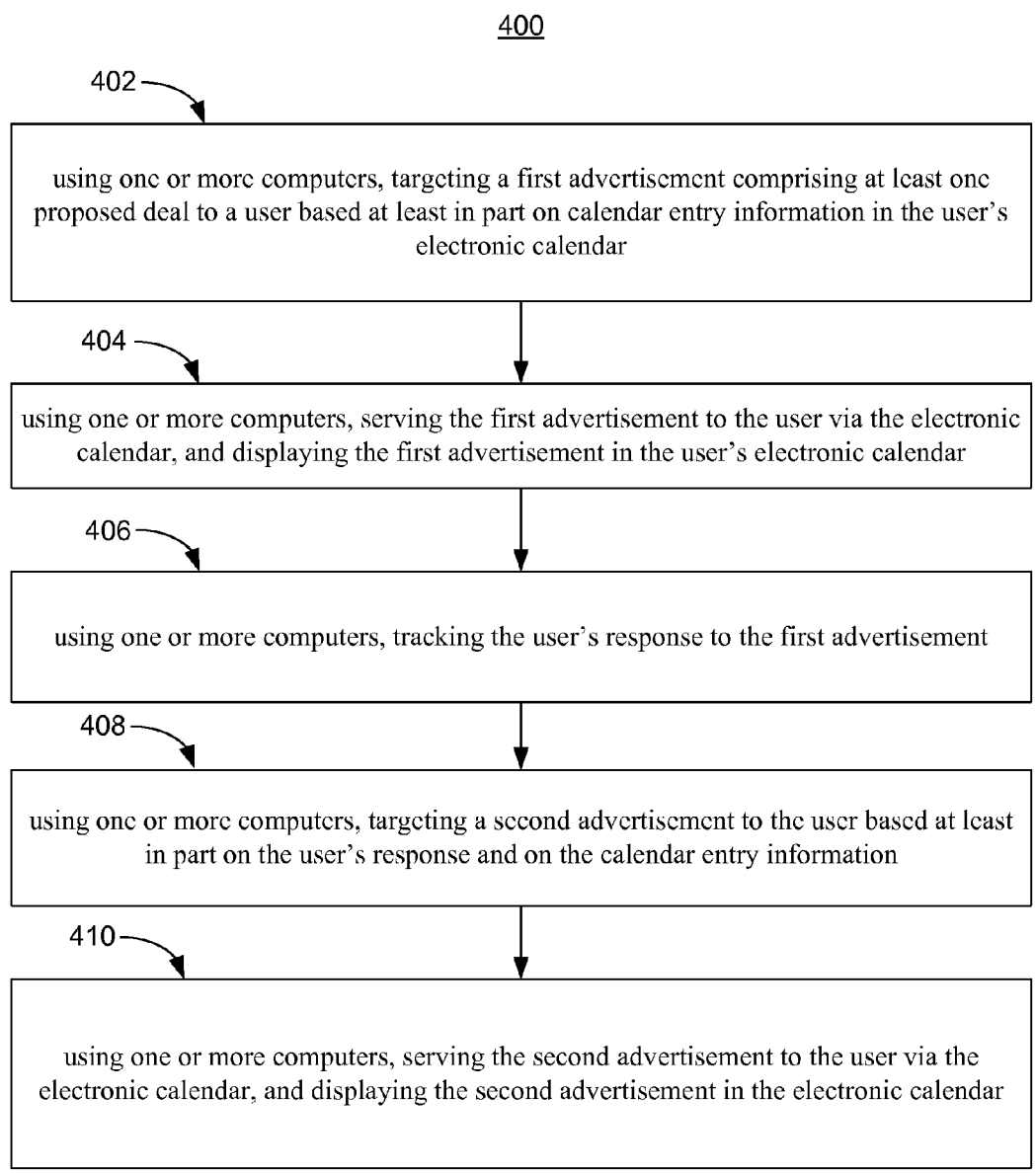
FIG. 4 is a flow diagram illustrating a method according to one embodiment of the invention.

FIG. 4 is a flow diagram illustrating a method 400 according to one embodiment of the invention. At step 402, using one or more computers, a first advertisement comprising at least one proposed deal is targeted to a user based at least in part on calendar entry information in the user's electronic calendar. The calendar entry information may include, for example, start time of a scheduled event, end time of a scheduled event, title of a scheduled event, description of a scheduled event, list of users invited to a scheduled event, location of a scheduled event, etc. In some embodiments, the advertisement may be received from one or more advertiser computers 106 (FIG. 1) and/or one or more server computers 108 (FIG. 1).

At step 404, using one or more computers, the first advertisement is served to the user via the electronic calendar, and the first advertisement is displayed in the user's electronic calendar. The advertisement may include textual, graphical, audio, video and/or link data.

At step 406, using one or more computers, the user's response to the first advertisement is tracked. The user's response may be tracked by, for example, one or more advertiser computers 106 (FIG. 1) and/or one or more server computers 108 (FIG. 1) by determining if the user has accepted or rejected the proposed deal.

At step 408, using one or more computers, targeting a second advertisement to the user based at least in part on the user's response and on the calendar entry information. At step 410, using one or more computers, the second advertisement is served to the user via the electronic calendar, and the second advertisement is displayed in the electronic calendar.

FIG. 5 is a block diagram 500 illustrating one embodiment of the invention. One or more data stores or databases 504 are depicted. Various types of information are stored in the database 504, which information may be obtained, gathered, or generated in various ways. Database 504 may be located in, for example, one or more server computers 108 (FIG. 1) and/or one or more advertiser computers 106 (FIG. 1). In particular, types of depicted information stored or collected by database 504 include calendar entry information 502 pertaining to one or more users. Calendar entry information 502 may comprise, among other things, start time of a scheduled event, end time of a scheduled event, title of a scheduled event, description of a scheduled event, list of users invited to a scheduled event, location of a scheduled event, etc.

As depicted in block 506, one or more of these types of information, possibly among other types, maybe used to target a user with a first advertisement. In some embodiments, the first advertisement may comprise one or more proposed deals. The proposed deal may include, for example, an advertised discount on certain products or services. The first advertisement may be served to the user via the electronic calendar by, for example, one or more advertiser computers 106 (FIG. 1) and/or one or more server computers 108 (FIG. 1). In exemplary embodiments, the first advertisement may include textual, graphical, audio, video and/or link data, and may be displayed in the electronic calendar. In one example, the advertisement may be displayed within a scheduled calendar entry. For example, if a user has a calendar entry entitled "Lunch" for 12-1 pm, the user may be targeted and served with a restaurant advertisement including discounted lunch specials.

Once the advertisement is served to the user, the user's response to the proposed deal included in the advertisement may be tracked as depicted in block 508. The user's response may be tracked by, for example, one or more advertiser computers 106 (FIG. 1) and/or one or more server computers 108 (FIG. 1) by determining if the user has accepted or rejected the proposed deal. In some embodiments, the user may accept or reject a proposed deal by, for example, clicking "accept" or "reject". The user's response may then be transmitted to one or more advertiser computers 106 (FIG. 1) and/or one or more server computers 108 (FIG. 1). In the above example, the user may "accept" or "reject" the discounted lunch specials. In some embodiments, by accepting a proposed deal, the user may be committing to participate in the advertised deal.

As depicted in block 510, a second advertisement may be targeted to the user based at least in part on the user's response to the proposed deal included in the first advertisement and at least in part on the calendar entry information. The second advertisement may also be served to the user via the electronic calendar by, for example, one or more advertiser computers 106 (FIG. 1) and/or one or more server computers 108 (FIG. 1) and may be displayed in the electronic calendar. In one example, the advertisement may be displayed within a scheduled calendar entry. In some embodiments, the second advertisement may be related to the first advertisement. For example, if the user accepts the discounted lunch specials promotion, the user may receive a second advertisement from the same restaurant including further discounts if, for example, the user goes to the restaurant at a specific time or brings along additional guests. In alternate embodiments, the second advertisement may be independent of the first advertisement. For example, if the user rejects the lunch specials promotion included in the first advertisement, the user may receive a second advertisement from a different restaurant or a coffee shop. Although two advertisements are discussed, it should be noted that the user may be targeted and served with any number of advertisements based at least in part on calendar entry information and/or the user's responses to proposed deals included in the advertisements.

As depicted in block 512, the user may forward the first and/or second advertisements to members of his social network 514. The user may be provided with an interface within the electronic calendar to enable forwarding of advertisements. The user may be enticed into forwarding the advertisements to other individuals by the prospect of additional discounts. In the above example, the second advertisement may include a promotional deal advertising a 20% discount if the user brings 3-5 friends to the restaurant, and a 30% discount if the user brings more than 5 friends. This may encourage the user to convince his friends to participate in the advertised promotional deal. In some embodiments, the forwarded advertisement may include one or more links associated with the user that forwarded the advertisement. This may provide an indication to recipients of the forwarded advertisement that a colleague has already agreed to participate in the advertised deal.

In an exemplary use scenario, Bob is a Yahoo! Calendar user. Bob adds a calendar entry from 12-1 PM entitled "Lunch" between other engagements. That event is sent to an ad server and returns targeted advertisements to be rendered inside Bob's calendar as a display/text advertisement. The relevant advertisement includes a deal/promotion for a restaurant that is located between his morning and afternoon engagements.

Bob is interested in a particular lunch deal from the advertised restaurant. Bob clicks on the deal to commit to the offer. This interaction is sent to the ad server which in-turn may notify the restaurant of Bob's intent. After Bob clicks on the deal, he is offered suggestions on alternative deals on his calendar from the restaurant in response to his commitment. For example, the following new advertisable calendar entries could appear after his commitment to a deal:

12-1 PM: 10% off meal price 1-2 PM: 15% off meal price 2-3 PM: 30% off meal price This may allow the restaurant to gauge commitment to deals allowing them to plan their capacity. If they are nearing their capacity, they can potentially bring-in customers during off-peak times by offering better deals at those times.

After Bob's commitment, the advertisable calendar entry may also displays deals to enable social advertising and group buying. For example, the deals on his calendar could offer the following after commitment:

12-1 PM: 10% off meal prices. Bring 3 more friends and get 20% off meals.

1-2 PM: 15% off meal prices. Bring 3 more friends and get 30% off meals.

The calendar offers Bob the ability to forward his advertised calendar entry to his friends' calendars. After Bob forwards his deal, which shows up on his friends' calendars, their advertisable calendar entry will have click-through links associated with Bob. As such, their commitments can be negotiated with the group. Bob finds out his friends are busy during 12-1 PM, but 3 of them can make the 1-2 PM time. Bob is also available at that time and thus changes his commitment to the 1-2 PM time. Now he is able to get together with his group of friends, get an extra discount, and he allowed the restaurant to bring-in and get commitment for a non-peak time (i.e. not the lunch rush).

While the invention is described with reference to the above drawings, the drawings are intended to be illustrative, and the invention contemplates other embodiments within the spirit of the invention.

The invention claimed is:

1. A method for encouraging group buying behavior through social interaction among electronic device users, the method comprising:

transmitting a first advertisement comprising at least one proposed deal to a user based at least in part on calendar entry information in the user's electronic calendar, and serving the first advertisement to the user via the electronic calendar by displaying the first advertisement within a calendar entry;

determining if the user has accepted the deal by clicking on a link associated with the first advertisement and the deal in the electronic calendar;

transmitting a second advertisement to the user based at least in part on the calendar entry information, and serving the second advertisement to the user via the electronic calendar by displaying the second advertisement within a calendar entry;

providing an interface within the electronic calendar configured to forward the second advertisement;

displaying the second advertisement including click-through links associated with the user; and receiving from a user device a negotiated deal based on commitments of the user and at least one other user.

2. The method of claim 1, wherein the second advertisement is related to the first advertisement.

3. The method of claim 1, wherein the calendar information comprises a time and description of a scheduled event.

4. The method of claim 1, wherein the second advertisement comprises a group deal.

5. The method of claim 1, wherein the second advertisement comprises a tiered deal.

6. The method of claim 1, further comprising:
utilizing the interface, presenting the user with an opportunity to forward the calendar entry including the second advertisement to one or more additional users via the electronic calendar.

7. The method of claim 6, further comprising:
displaying the second advertisement including the click-through links associated with the user, in the one or more additional users' respective electronic calendars within a calendar entry.

8. The method of claim 1, further comprising:
using one or more computers, presenting the user with an opportunity to forward the second advertisement to one or more additional users via a social networking platform.

9. The method of claim 6, wherein the second advertisement includes one or more links associated with the user that accepted the deal included in the first advertisement.

10. A system for encouraging group buying behavior through social interaction among electronic device users, the system comprising:
one or more server computers coupled to a network; and
one or more databases coupled to the one or more server computers;
wherein the one or more server computers are for:
transmitting a first advertisement comprising at least one proposed deal to a user based at least in part on calendar entry information in the user's electronic calendar, and serving the first advertisement to the user via the electronic calendar by displaying the first advertisement within a calendar entry;
determining if the user has accepted the deal by clicking on a link associated with the first advertisement and the deal in the electronic calendar;
transmitting a second advertisement to the user based at least in part on the calendar entry information, and serving the second advertisement to the user via the electronic calendar by displaying the second advertisement within a calendar entry;
providing an interface within the electronic calendar configured to forward the second advertisement;
displaying the second advertisement including click-through links associated with the user; and
receiving from a user device a negotiated deal based on commitments of the user and at least one other user.

11. The system of claim 10, wherein the second advertisement is related to the first advertisement.

12. The system of claim 10, wherein the calendar information comprises a time and description of a scheduled event.

13. The system of claim 10, wherein the second advertisement comprises a group deal.

14. The system of claim 10, wherein the second advertisement comprises a tiered deal.

15. The system of claim 10, wherein the one or more server computers are further configured to:
present the user with an opportunity to forward the second advertisement to one or more additional users via the electronic calendar.

16. The system of claim 15, wherein the one or more server computers are further configured to:
display the second advertisement in the one or more additional users' respective electronic calendars.

17. The system of claim 10, wherein the one or more server computers are further configured to:
present the user with an opportunity to forward the second advertisement to one or more additional users via a social networking platform.

18. The system of claim 10, wherein the first and second advertisements are displayed in the user's electronic calendar, within a calendar entry corresponding to the calendar entry information.

19. The system of claim 15, wherein the second advertisement includes one or more links associated with the user that accepted the deal included in the first advertisement.

* * * * *